United States Patent Office 3,467,619
Patented Sept. 16, 1969

3,467,619
POLYESTER COMPRESSION MOULDING MASSES
Karl Raichle, Krefeld-Bockum, Friedrich Bruhne, Krefeld, Klaus Prater, Krefeld-Bockum, Gunther Nischk, Leverkusen-Wiesdorf, and Karl-Heinz Andres, Cologne-Flittard, Germany, assignors to Farbenfabriken Bayer Aktiengesellschaft, Leverkusen, Germany, a corporation of Germany
No Drawing. Filed Dec. 23, 1964, Ser. No. 420,808
Claims priority, application Germany, Jan. 18, 1964,
F 41,778
Int. Cl. C08f 21/00, 45/04
U.S. Cl. 260—40         7 Claims

ABSTRACT OF THE DISCLOSURE

Polyester compression moulding mass and process for producing same by initially dissolving a magnesium compound into an unsaturated polyester component at about 60–190° C. to obtain an intermediate polyester product containing about .05%–3% by weight of magnesium in salt-like form, dissolving the intermediate polyester product in a copolymerizable unsaturated monomeric compound, cooling and adding about .5%–10% magnesium oxide by weight of the mixture, admixing filler, additives and an active amount of catalyst therein to obtain the moulding mass.

---

The present invention is concerned with polyester compression moulding masses.

It is known to produce polyester compression moulding masses from polyester moulding compounds, i.e. from catalyst-containing solutions of unsaturated, polymerizable polyesters in monomeric unsaturated compounds co-polymerizable therewith, and reinforcing fillers, especially glass fibres, such as glass fibre mats or fabrics, or powdery fillers, which can be hardened by heating under pressure and by moulding to give valuable moulded articles. However, the polyester compression moulding masses described are, in practice, difficult to handle since they generally do not possess tack-free surfaces and the polyester resin bleed out at the temperatures necessary for hardening as a result of a reduction in viscosity, so that non-uniformed hardened products result.

It is known that these disadvantages can be avoided by admixing small amounts of finely-divided magnesium oxide with the polyester moulding masses prior to adding the fillers. The polyester compression moulding masses thus obtained possess, however, a number of further disadvantages which render their production and their practical application difficult. Thus, in particular, the viscosity increases only slowly after the addition of the magnesium oxide so that frequently the compression moulding masses only thicken after several weeks to such an extent that they are tack-free and thus ready for further processing. This means that an undesirably prolonged and disadvantageous storage is necessary when such compression masses are to be continuously produced and worked up. The use of polyester compression moulding masses of this type is also impaired to a large extent by the fact that the increase in viscosity occurring after the addition of the magnesium oxide cannot always be reproduced with certainty, i.e., the thickening times vary considerably so that, inter alia, there is a risk that individual batches mature too much and can no longer be satisfactorily worked up.

We have now found that all the above-mentioned disadvantages can be avoided and polyester compression moulding masses can be obtained from unsaturated polyesters, monomeric unsaturated compounds copolymerizable therewith, fillers, as well as catalysts, which contain magnesium oxide and thicken quickly and reproducibly to tack-free products, if they are produced, at least in part, by using unsaturated polyesters which have been obtained by the reaction of conventional unsaturated polyesters with magnesium compounds in such quantities that the unsaturated polyesters contain at least about 0.05 percent by weight of magnesium incorporated in salt-like form.

Surprisingly, the so produced polyester compression moulding masses show, while the processing periods remain substantially the same, a considerable shortening of the thickening time necessary for attaining the tack-free state, after the addition of the magnesium oxide. (By the expression "processing period" there is to be understood that period of time which lies between the complete maturing of the mixture and the commencing of gel formation.) Whereas, moreover, the thickening times of the previously used polyester moulding masses with magnesium oxide are also subject, from case to case, to great variations, the polyester compression moulding masses according to the invention thicken with a good reproducibility, thus rendering possible a substantially more rational working up.

Consequently, it was not to be foreseen that it would be possible, by the process according to the present invention, and with the use of any desired unsaturated polyester, to produce rapidly and reproducibly tack-free polyester compression moulding masses which are storable for long periods of time.

Usual unsaturated polyesters in the meaning of the present invention are the products with a content of radicals of $\alpha,\beta$-olefinically-unsaturated dicarboxylic acids of at least about 10 mol percent, referred to the total content of carboxylic acid radicals, obtainable by the polycondensation of $\alpha,\beta$-olefinically-unsaturated dicarboxylic acids, such as maleic acid, monochloromaleic acid, fumaric acid, mesaconic acid, itaconic acid, citraconic acid or dimeric methacrylic acid, or their esters or anhydrides or mixtures thereof, with, optionally unsaturated, polyhydric alcohols, such as ethylene glycol, ene-1,4-diol, hexane-1,6-diol or diethylene glycol, polyalkylene glycol ethers, bis-$\beta$-hydroxyalkyl ethers of aromatic dihydroxy compounds, such as 2,2-bis-(4-$\beta$-hydroxyalkoxy-phenyl)-alkanes or -cycloalkanes, xylylene glycols, 1,3-dimethylol-cyclobutane, quinite or 2,2-bis-(hydroxycyclohexyl)alkanes or -cycloalkanes, optionally with the addition of other conventional dicarboxylic acids, such as o-phthalic acid, isophthalic acid, terephthalic acid, tetrahydrophthalic acid, hexahydrophthalic acid, tetrachlorophthalic acid, endomethylene-tetrahydrophthalic acid, hexachloro-endomethylene-tetrahydrophthalic acid, succinic acid, glutaric acid, adipic acid or pimelic acid, or of other mono- or polyhydric alcohols or carboxylic acids, such as acrylic acid, methacrylic acid, coconut fatty acid, stearic acid, palmitic acid, lauric acid, trimellitic acid, glycerol, trimethylol-ethane, trimethylol-propane, pentaerythritol or allyl alcohol, or par- Co-polymerizable monomeric unsaturated compounds are, for example, the allyl and vinyl compounds customarily used for the production of polyester moulding masses, for example, styrene, substituted styrenes, such as p-vinyl-toluene, acrylic acid esters and methacrylic acid esters, as well as allyl and vinyl esters.

The content of unsaturated polyesters in the polyester compression moulding masses according to the present invention can vary within wide limits. In general, it amounts to about 10 to about 90 percent by weight, preferably about 25 to about 80 percent by weight, referred to the polyester solutions in the copolymerizable unsaturated compounds. The unsaturated polyesters may also contain the usual inhibitors, for example, hydroquinone, tert.-butyl-catechol, benzoquinone or di-tert.-butyl-benzoquinone, in the usual amounts, i.e., in general, about 0.001 to about 0.1%.

As magnesium compounds which, according to the present invention, are reacted with unsaturated polyesters, all magnesium compounds can be used which are able to react with the polyesters with the formation of magnesium salts. Examples of magnesium compounds of this type are, besides magnesium oxide and magnesium hydroxide, magnesium salts of organic compounds, such as magnesium formate and acetate, magnesium salts of halogenated acetic acids, magnesium propionate, magnesium acetylacetonate and magnesium acetoacetate, as well as magnesium carbonate, basic magnesium carbonate and magnesium alcoholate.

The magnesium compounds are expediently reacted with the unsaturated polyesters at elevated temperatures. A mixture of the magnesium compound and of the unsaturated polyester, which preferably possesses an acid number between about 10 and about 100, is heated at temperatures of about 60 to about 190° C. for a short time, possibly with stirring and in the presence of an inert gas. The magnesium compounds may also be added to the unsaturated polyesters during their production and before termination of the polycondensation. The mentioned magnesium compounds can be added to the unsaturated polyesters either as such or in the form of pastes or of other preparations which facilitate the mixing of the components. Examples of preparations of this type are pastes of magnesium oxide and plasticisers, such as dibutyl phthalate.

During the reaction, an increase in viscosity occurs, the extent of which depends, inter alia, on the polarity of the unsaturated polyester. With less polar polyesters, a greater increase in viscosity is observed than with polyesters of greater polarity.

If the operation is carried out at lower temperatures than stated, then several days are needed for the complete dissolving of the magnesium compound. At temperatures which are too high, the initially clear polyesters again become cloudy, with the separation of metal-containing precipitates, and lose their properties according to the present invention. The temperature at which a clouding first occurs is dependent upon the polarity of the unsaturated polyester. Thus, for example, strongly polar, magnesium-containing, unsaturated polyesters with over 1.1 mol ester groups per 100 g., can be heated at 180° C. for more than 8 hours without cloudiness occurring, whereas less polar ones already become cloudy at 140° C.

The magnesium content of the unsaturated polyesters or of the polyester mixtures produced therewith, can vary within wide limits; it is dependent upon the constitution of the unsaturated polyester and upon the desired degree of increase in viscosity. In general, it is sufficient that the magnesium content of the unsaturated polyesters amounts to about 0.05 to 3.0, preferably about 0.2 to about 1.5%.

The magnesium-containing, unsaturated polyesters obtained are dissolved, possibly together with other magnesium-free unsaturated polyesters, in co-polymerizable monomeric unsaturate compounds, or solutions of magnesium-free and magnesium-containing unsaturated polyesters are mixed with one another in monomeric co-polymerizable compounds. The polyester solutions obtained are then mixed with further amounts of magnesium oxide and, at the same time or a short time later, mixed with a catalyst which is as stable as possible at room temperature, but yields polymerization-initiating radicals upon heating, such as benzoyl peroxide, dicumol peroxide, cumol hydroperoxide, tert.-butyl-hydroperoxide, di-tert.-butyl peroxide, tert.-butyl perbenzoate, azo-diisobutyric acid dinitrile or pinacones forming effective radicals, such as benzopinacone, in amounts of about 0.5 to about 5 percent by weight, calculated on the weight of the solutions. Mixtures of various hardening catalysts can also be used with advantage.

The amounts of magnesium oxide additionally to be added to the polyester solutions of magnesium-containing unsaturated polyesters are likewise dependent upon the above-mentioned conditions and can, therefore, vary within wide limits. In general, an addition of about 0.5 to about 10 percent by weight magnesium oxide, referred to the total weight of the polyester-monomeric compound-magnesium oxide mixture suffices.

The mixtures are immediately used thereafter for the impregnation of fillers, such as chalk, kaolin, kieselguhr, talc or quartz powder, or fibres and fabrics, especially glass fibres and glass fibre rovings, mats and fabrics, in the usual amount, e.g. about 20 to about 50 percent by weight, referred to the weight of the total compression moulding masses.

The polyester compression moulding masses so obtained are already tack-free after only a short time and can thereafter be worked up by heating under pressure and with moulding in the usual manner to give moulded articles of any kind.

The amounts stated in the following examples, which are given for the purpose of illustrating the present invention, are parts by weight and percentages by weight:

Example 1

In each of a total of 6 experiments, 19.9 mol maleic anhydride, 5.1 mol phthalic anhydride, 15.0 mol butane-1,3-diol and 10.85 mol ethylene glycol are esterified to an unsaturated polyester with an acid number of 35, a 65% solution of which in styrene posseses, at 20° C., a viscosity of about 1100 cp. Stabilization of the monomer-free polyester is effected with 0.01% hydroquinone.

(a) In each of a total of 3 experiments, 3000 parts of the individual polyesters are mixed with 21 parts light, pure magnesium oxide and heated to 150 to 155° C. within the course of one hour, while stirring and passing over a stream of nitrogen, and maintained at this temperature for a half hour, the initially cloudy mixture thereby being converted into a clear melt. After cooling to 110° C., the products are, in each case, dissolved in styrene to give a 65% solution which possesses a viscosity of about 3400 cp. at 20° C.

The thickening times with magnesium oxide are determined for these products. For this purpose, samples of the products were triturated on a roller mill with 1.5% light, pure magnesium oxide and stored at 20° C. By the term "thickening time," there is to be understood the time after which the mass has reached a viscosity of 30 million cp. At this value, the products are, in general, tack-free. The result of these measurements, which were carried out with the rotation viscosimeter, is given in the following table:

TABLE 1

Thickening times with 1.5% magnesium oxide of the magnesium-containing polyester mixtures produced according to Example 1a.

Total magnesium content trickening time, days

Experiment 1, 1.16% _____ 4
Experiment 2, 1.16% _____ 3
Experiment 3, 1.16% _____ 3

(b) For comparison, in a total of 3 further experiments, the thickening times of polyester solutions with a 65% solids content produced from the amove-mentioned but magnesium-free polyesters by dissolving in styrene, were determined in the same manner. The thickening took place, in each case, by the addition of 1.95% magnesium oxide so that the comparative examples had the same total magnesium content as the polyester mixtures of Table 1. The thickening times obtained are given in the following table:

TABLE 2

Thickening times with 1.95% magnesium oxide of the magnesium-free polyester mixtures produced according to Example 1b.

| | Total magnesium content | thickening time, days |
|---|---|---|
| Experiment 4, 1.16% | | 9 |
| Experiment 5, 1.16% | | 8 |
| Experiment 6, 1.16% | | 14 |

Example 2

In each of a total of 5 experiments, 15.5 mol maleic anhydride, 9.5 mol phthalic anhydride and 25.6 mol propylene-1,2-glycol are esterified to an unsaturated polyester with an acid number of 42, the 65% solution of which in styrene has a viscosity of about 1200 cp. at 20° C. The stabilization of the monomer-free polyester is effected with 0.01% hydroquinone.

(a) In each of a total of 3 experiments, 3000 parts of the individual polyesters are heated to 150 to 155° C. within the course of one hour with 21 parts light, pure magnesium oxide, while stirring and passing over a stream of nitrogen, and maintained at this temperature for one hour, the initially cloudy mixture thereby being converted into a clear melt. After cooling to 110° C., the clear products are, in each case, dissolved in styrene to give a 65% solution, which possesses a viscosity of about 3400 cp. at 20° C.

The thickening times were determined for these products with magnesium ovide. For this purpose, samples of ucts with magnesium oxide. For this purpose, samples of light, pure magnesium oxide and stored at 20° C.

TABLE 3

Thickening times with 1.5% magnesium oxide of the magnesium-containing polyester mixtures produced according to Example 2a.

| | Total magnesium content | thickening time, days |
|---|---|---|
| Experiment 1, 1.16% | | 10 |
| Experiment 2, 1.16% | | 11 |
| Experiment 3, 1.16% | | 12 |

(b) For comparison, in 2 further experiments, the thickening time of polyester mixtures with a 65% solids contents produced from the above-mentioned but magnesium-free polyesters by dissolving in styrene, were determined in the same manner. The thickening took place, in each case, by the addition of 1.95% magnesium oxide. The results are given in Table 4:

TABLE 4

Thickening times with 1.95% magnesium oxide of the magnesium-free polyester mixtures produced according to Example 2b.

| | Total magnesium content | thickening time, days |
|---|---|---|
| Experiment 5, 1.16% | | 29 |
| Experiment 6, 1.16% | | 16 |

Example 3

(a) In each of a total of 3 experiments, 2500 parts of individual polyesters produced according to Example 1 are heated to 150 to 155° C. within the course of one hour with 15 parts light, pure magnesium oxide, while stirring and passing over a stream of nitrogen, and maintained at this temperature for half an hour. After cooling to 110° C., the clear products are, in each case, dissolved in styrene to give 65% solution which possess a viscosity of about 2400 cp. at 20° C.

TABLE 5

Thickening times with 1.91% magnesium oxide of the magnesium-containing polyester mixtures produced according to Example 3a.

| | Total magnesium content | thickening time, days |
|---|---|---|
| Experiment 1, 1.36% | | 4 |
| Experiment 2, 1.36% | | 4 |
| Experiment 3, 1.36% | | 4 |

(b) For comparison, in a total of 3 further experiments, the thickening times of polyester mixtures with a 65% solids content produced from the corresponding magnesium-free polyesters by dissolving in styrene, were determined in the same manner. The thickening took place in each case by the addition of 2.3% magnesium oxide. The results are given in Table 6.

TABLE 6

Thickening times with 1.91% magnesium oxide of the magnesium-free polyester mixtures according to Example 3b.

| | Total magnesium content | thickening time, days |
|---|---|---|
| Experiment 4, 1.36% | | 7 |
| Experiment 5, 1.36% | | 7 |
| Experiment 6, 1.36% | | 8 |

These examples show the quicker and better reproducible thickening of the polyester moulding masses produced according to the present invention with magnesium oxide, with the same total magnesium content. If hardening catalysts, as well as fibres or fabrics, and possibly also other fillers, are added to these products, together with the magnesium oxide or after its addition, then, after expiry of the thickening time, tack-free polyester compression moulding masses are obtained which can be moulded by heating, within a few minutes, to give non-fusible mouldings. The thickening times achieved after the addition of the magnesium oxide according to the above examples are not influenced by the presence of hardening catalysts.

We claim:

1. A process for producing a tack-free polyester compression moulding mass comprising initially dissolving a magnesium compound into an unsaturated polyester component with heating to a temperature of about 60°–190° C. to obtain an intermediate polyester reaction product containing about .05%–3% by weight of magnesium in salt-like-form, dissolving said intermediate polyester component in a copolymerizable unsaturated monomeric compound, cooling, adding about .5–10% magnesium oxide by weight of the intermediate polyester product-monomeric compound-magnesium oxide mixture, adding filler and an active amount of catalyst and thereafter storing the mass until it has become tack-free.

2. The process of claim 1 wherein sufficient magnesium compound is reacted with said unsaturated polyester reactant to obtain an intermediate polyester reaction product having .2%–1.5% magnesium in salt-like form.
.2%–1.5% magnesium in salt-like form.

3. The process of claim 1 wherein said polyester component contains about .001–.1% of a polymerization inhibitor.

4. The process of claim 1 wherein about .5–5% by weight of catalyst is utilized in said polyester-monomeric mixture.

5. The process of claim 1 wherein about 10–90% by weight of the polyester solution in the copolymerizable unsaturated monomeric compound is unsaturated polyester.

6. The process of claim 1 wherein about 25–80% by weight of the polyester solution in the copolymerizable unsaturated monomeric compound is unsaturated polyester.

7. The process of claim 1 wherein is added about 20–50% filler by weight of moulding mass.

References Cited

FOREIGN PATENTS 683,007   3/1964   Canada.

MORRIS LIEBMAN, Primary Examiner

R. BARON, Assistant Examiner

U.S. Cl. X.R.

260—75, 861

PO-1050
(5/69)

UNITED STATES PATENT OFFICE
CERTIFICATE OF CORRECTION

Patent No. 3,467,619  Dated September 16, 1969

Inventor(s) RAICHLE ET AL

It is certified that error appears in the above-identified patent and that said Letters Patent are hereby corrected as shown below:

Col. 2, between lines 47-48, insert -- propane-1,3-diol, butane 1,3-diol, butane-1,4-diol, but-2- --;
Col. 2, between lines 64-65, insert -- tial ethers of monohydr or polyhydric aliphatic alcohols. --;

Col. 5, lines 40-44, replace with -- The thickening times were determined for these products with magnesium oxide. For this purpose, samples of the products were triturated on a roller mill with 1.5% light, pure magnesium oxide and stored at 20°C.
Col. 6, cancel line 69.

SIGNED AND
SEALED
JUN 9 1970

(SEAL)
Attest:

Edward M. Fletcher, Jr.
Attesting Officer

WILLIAM E. SCHUYLER, JR.
Commissioner of Patents